UNITED STATES PATENT OFFICE 2,548,141

HALO-ARYL ALLYL CARBONATES AND POLYMERS THEREOF

James A. Bralley, Bristol, Pa., assignor to The B. F. Goodrich Company, New York, N. Y., a corporation of New York No Drawing. Application March 19, 1947, Serial No. 735,795

5 Claims. (Cl. 260—77.5)

This invention relates to unsaturated esters of carbonic acid and to polymers thereof, and pertains particularly to halo-aryl allyl carbonates and to the production of polymers therefrom.

In general, esters of carbonic acid in which only one of the acidic hydrogens is replaced by an allyl group polymerize, if at all, only with great difficulty.

I have discovered, however, that similar esters of carbonic acid in which one of the acidic hydrogens is replaced by an allyl group and the other is esterified with a nuclear-halogenated monohydric phenol, are quite useful polymerizable compounds. They may be readily polymerized alone or with other polymerizable compounds containing a single olefinic double bond, to produce thermoplastic polymers (the term "polymer" being used to include "copolymers" and "mixed polymers") ranging in properties from soft-viscous liquids or semi-solids to extremely hard rigid solids of excellent heat and light stability. They may also be polymerized in admixture with polymerizable compounds containing two or more unconjugated olefinic bonds, such as the polyallyl esters, to produce hard non-thermoplastic polymers of increased toughness and reduced brittleness. Besides being useful in preparing valuable polymers, the monomeric esters (and also the polymers thereof which are soft viscous liquids or semi-solids), are adaptable as plasticizers for other resinous materials. The monomeric esters may also serve as intermediates in the preparation of other organic compounds, as active ingredients for biologically useful compositions and for other purposes.

This class of esters, which may be referred to as halo-aryl allyl carbonates, includes not only the halo-phenyl allyl carbonates but also similar compounds in which the phenyl radical contains hydrocarbon substituents such as alkyl, aryl aralkyl, alkaryl, cycloalkyl, alkenyl and other hydrocarbon groups. Compounds containing condensed aromatic rings such as the halo-naphthyl allyl carbonates are also included but are generally not so useful as those derived from monohydroxy benzenes. The halogen present is preferably chlorine, although it may also be bromine, fluorine or iodine. Compounds in which chlorine is present in the ortho position of a benzene ring are particularly preferred since they polymerize with greatest ease and yield most useful polymers.

Preparation of these new compounds may be effected by the reaction of allyl chlorocarbonate (allyl chloroformate) with the appropriate nuclear-halogenated phenol in the presence of an alkaline agent, such as an alkali hydroxide or pyridine or other organic base or the like, which aids in the elimination of hydrogen chloride from the reactants.

The following specific examples illustrate the preparation of the esters of this invention and the preparation of polymers therefrom.

Example I

Para-chlorophenyl allyl carbonate was prepared according to the following reaction:

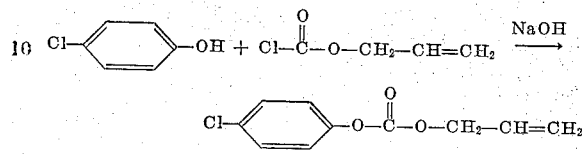

To 128.5 grams of para-chlorophenol, 120.5 grams of allyl chlorocarbonate and 500 c. c. of water in a one liter flask there was added in a drop-wise manner a solution of 40 grams of sodium hydroxide in 200 ml. of water. The flask was cooled to 3° C. and the dropwise addition of sodium hydroxide was regulated so the temperature remained below 10° C. An oily layer separated from the water and this layer was washed with three portions of water and dried over sodium sulfate. The resulting crude product possessed a bright yellow color. The crude oil was then fractionally distilled under a reduced pressure of 2.5 m. m. of mercury. 205 grams (96.5% yield) of para-chlorophenyl allyl carbonate (B. P.=105 to 109° C. at 2.5 m. m.; $n_D^{20}=1.5159$) were thus obtained.

To illustrate polymerization of this ester, 33.68 grams of the above-prepared para-chlorophenyl allyl carbonate and 1.35 grams of ortho-chloro benzoyl peroxide, as polymerization catalyst, were placed in a small glass polymerization tube which was warmed and shaken to dissolve the catalyst, evacuated and sealed in an atmosphere of pure nitrogen, and then heated in a water bath maintained at 60° C. for 17 hours. The resulting polymerization product was an oily material of greater viscosity than the monomer and useful as a plasticizer for various resinous materials. When the polymerization was carried out for 24 hours at 75° C. the polymer was a soft, thermoplastic, semi-solid material.

Example II 50 grams of meta-chlorophenol, 47 grams of allyl chlorocarbonate and 500 ml. of water were placed in a 1 liter flask and a solution of 16 grams of sodium hydroxide in 100 ml. of water was added in a dropwise fashion. The flask was cooled to 3° C. and the reaction was regulated to maintain the temperature below 10° C. The oily layer was washed three times with water and then dried over sodium sulfate. The oily layer was distilled at a pressure of 3 m. m. of mercury and a water white fraction consisting of meta-chlorophenyl allyl carbonate (B. P.=107 to 108° C. at 3 m. m.; $n_D^{20}$=1.5150) was obtained in excellent yield.

The above material was then polymerized by the method of Example I to yield a clear, heavy, syrupy polymer of much greater viscosity than the monomer.

Example III 128.5 grams of ortho-chlorophenol and 120.5 grams of allyl chlorocarbonate were suspended in 3 liters of water and cooled to 7° C. A solution of 40 grams of sodium hydroxide in 300 ml. of water was then added to the suspension in a dropwise manner so as to control the temperature below 10° C. The oily layer was washed once with a 1% sodium hydroxide solution and four times with distilled water. The crude oily material was distilled under 3 m. m. Hg vacuum. A fraction was obtained which distilled at 106° C. and which was possessed of an index of refraction of $n_D^{20}$=1.5133.

The above material, ortho-chlorophenyl allyl carbonate, was polymerized in a small glass polymerization tube in the presence of 4% by weight of ortho-chlorobenzoyl peroxide. After heating at 60° C. for 17 hours, the polymer obtained was a hard, water-white, glass-like solid at room temperature. The material did not increase appreciably in hardness or lose its valuable properties when heated at 100° C. for 72 hours.

The previous Examples I, II and III have demonstrated that the chlorophenyl allyl carbonates readily polymerize to form clear thermoplastic polymers. For purposes of comparison a sample of phenyl allyl carbonate,

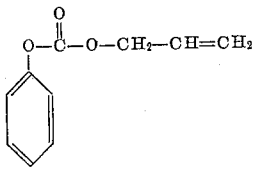

prepared by the reaction of phenol and allyl chlorocarbonate in the presence of sodium hydroxide, was heated in the presence of ortho-chlorobenzoyl peroxide at 60° C. for 17 hours but the volume and viscosity of liquid material remained substantially unchanged.

Example IV 2,4-dichlorophenyl allyl carbonate was prepared by combining 48.9 grams of 2,4-dichlorophenol, 37.1 grams of allyl chloroformate, and 50 ml. of distilled acetone in a flask and then adding a solution of 12.8 grams of sodium hydroxide in 60 ml. of water in a dropwise fashion while maintaining the reaction temperature between 5 and 10° C. The product layer was separated and washed with five successive portions of water. The product was diluted with distilled acetone and dried over sodium sulfate. The acetone was distilled off and the resulting oil was distilled under vacuum. 53 grams of 2,4-dichlorophenyl allyl carbonate distilling at 90° C. at 1 m. m. Hg vacuum was obtained. Its index of refraction was $n_D^{20}$=1.5266.

20.9 grams of the monomeric 2,4-dichlorophenyl allyl carbonate prepared above was placed in a small polymerization tube with 0.6 gram of acetyl benzoyl peroxide and the tube sealed under nitrogen. The tube was placed in a water bath maintained at 60° C. and heated for 96 hours. The resulting product was a heavy syrupy liquid which changed to a semi-solid having little tendency to flow when cooled to room temperature.

Example V 2,6-dichlorophenyl allyl carbonate was prepared by mixing 54.3 grams of 2,6-dichlorophenol, 42.2 grams of allyl chlorocarbonate and 150 ml. of ether in a flask. A solution of 14.7 grams sodium hydroxide in 75 ml. of water was added in a dropwise fashion while maintaining the temperature of the mixture below 10° C. The oily layer was separated, diluted with 150 ml. ether, washed five times with water and once with 2% sodium hydroxide solution and dried over sodium sulfate. The oily material was distilled and 45.6 grams of a water-white liquid, 2,6-dichlorophenyl allyl carbonate, was obtained. This compound distilled at 108 to 114° C. at 1 m. m. Hg and was possessed of an index of refraction ($n_D^{20}$) of 1.5237.

Polymerization of the monomeric 2,6-dichlorophenyl allyl carbonate prepared by the above method was accomplished by heating 19.85 grams of the ester in an atmosphere of carbon dioxide and in the presence of 0.40 gram of benzoyl peroxide for 64 hours at 60° C. and then for 8 hours at 100° C. The polymeric product was a very hard, glass-like solid.

Example VI

Ortho-chloro-para-(phenylisopropyl) - phenyl allyl carbonate

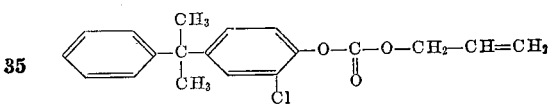

was prepared by a method similar to those of Examples I to V using o-chloro-p-(phenylisopropyl)-phenol as a starting reactant. Polymerization of this monomer was accomplished in 68 hours at 60° C. in the presence of 3% acetyl benzoyl peroxide to form a very heavy syrupy material of a light yellow color which did not flow appreciably at 60° C.

Examples VII to IX

Other halo-aryl allyl carbonates were prepared by methods similar to those of the above examples and polymers were prepared therefrom by polymerization in the presence of a peroxide-type catalyst. Thus, ortho-chloro-p-tertiary-butyl-phenyl allyl carbonate,

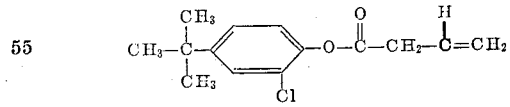

was polymerized to a gel-like solid which upon moderate heating to 60° C. or higher becomes a thick syrupy liquid; 2-bromo-4-tertiary butyl phenyl allyl carbonate was polymerized to a thick gel-like solid which upon being pulled out like taffy appears to become oriented and ortho-chloro-p-phenyl-phenyl allyl carbonate,

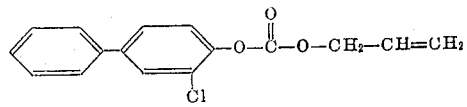

likewise was polymerized to a thermoplastic, clear material which exhibited little tendency to flow at 60° C. and which was almost taffy-like at room temperature.

Other halo-aryl allyl carbonates similar to those illustrated in the examples may be prepared by similar procedures, starting with the appropriate nuclear-halogenated mono-hydric phenol and allyl chlorocarbonate. As examples of other such esters, also within the scope of this invention, there may be mentioned the trichlorophenyl allyl carbonates, pentachlorophenyl allyl carbonate, chlorotolyl allyl carbonates, chloroxylyl allyl carbonates, chlorocumyl allyl carbonates, chloronaphthyl allyl carbonates and the like.

The monomeric esters of this invention may be polymerized in the presence of any of the usual catalysts such as benzoyl peroxide, orthochlorobenzoyl peroxide, dibenzoyl peroxide, diacetyl peroxide, caprylyl peroxide, sodium persulfate, the perborates, the percarbonates, hydrogen peroxide, acetyl benzoyl peroxide, ditoluyl peroxide, actinic light, and others. Although the polymerization may be carried out in solution or in aqueous emulsion, it is preferred to carry out the polymerization merely by dissolving a suitable amount of catalyst (from 0.5 to 5.0% by weight or more) in the monomeric ester, and then heating the mixture moderately, that is, to a temperature below about 150° C., preferably to a temperature of from 60 to 100° C. until polymerization is complete. It has been found that the polymerization reaction proceeds most satisfactorily in the absence of atmospheric oxygen and for that reason it is preferred to carry on the polymerization in a closed vessel under vacuum or under an inert atmosphere such as pure nitrogen or carbon dioxide. Any air dissolved in the monomeric material is preferably removed prior to polymerization by placing the monomeric material in a closed vessel and reducing the pressure therein, with or without mild heating, until the air bubbles have escaped.

As mentioned hereinabove, the esters of this invention may be polymerized in admixture with other polymerizable materials to form either mixed polymers or copolymers. Examples of other polymerizable materials which may be used include the various vinyl and vinylidene compounds such as vinyl chloride, vinyl acetate and other vinyl esters, vinylidene chloride, methyl acrylate, methyl methacrylate, glycol di-methacrylates, and other esters of acrylic and alpha-substituted acrylic acids; styrene and other mono-olefinic hydrocarbons, butadiene-1,3, divinyl benzene and other hydrocarbons containing more than one olefinic bond, and the like. Especially valuable hard, nonthermoplastic resins are obtained when the esters of this invention are polymerized in admixture with polyallyl esters which polymerize alone to give hard but brittle non-thermoplastic resins since the presence of the chloroaryl allyl carbonate considerably increases their toughness and reduces brittleness. Polyallyl esters which copolymerize with these halo-aryl allyl carbonates to give especially valuable resins of this nature include diallyl succinate, diallyl adipate, triallyl phosphate, triallyl aconitate, and the like and especially the diallyl carbonate esters of polyhydroxy compounds such as ethylene glycol, diethylene glycol, glycerine, diethanol amine, hydroquinone, pyrogallol, and other polyhydric phenols, alkylidene bis-phenols and their nuclear halogenated derivatives such as 2,2-bis-(4-hydroxyphenyl) propane, and other carbonate esters of the general formula

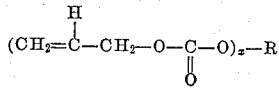

wherein R is an organic radical, preferably a hydrocarbon radical or a halogen or other substituted hydrocarbon radical, of $x$ valence and $x$ is a small whole number greater than 1, preferably from 2 to 4.

To illustrate the preparation of such hard non-thermoplastic resins of reduced brittleness the following examples are set forth.

Example X

A mixture of 40 parts of ortho-chlorophenyl allyl carbonate and 60 parts of diallyl hydroquinone dicarbonate was heated for 19 hours at 60° C. in the presence of 3% by weight of orthochloro benzoyl peroxide. The resulting copolymer was a hard, tough, non-thermoplastic resin. It was equally as hard as a material prepared in the same way using the diallyl dihydroquinone dicarbonate alone but was much tougher and less brittle and did not chip or crack so easily. A similar result was also secured when diallyl 2,2-bis-(3,5-dichloro-4-hydroxy-phenyl) propane dicarbonate was substituted in the above example for the diallyl hydroquinone dicarbonate.

Example XI

Ortho-chloro-para-phenylisopropyl-phenyl allyl carbonate was copolymerized with diallyl-2,2-bis-(3-chloro-4-hydroxyphenyl) propane dicarbonate. In one polymerization tube 4.73 grams of the dicarbonate ester and 9.45 grams of the carbonate ester were admixed with 0.29 gram of ortho-chloro-benzoyl peroxide; and in another tube, 9.89 grams of the dicarbonate ester and 4.95 grams of the carbonate ester were admixed with 0.30 gram of ortho-chloro-benzoyl peroxide. The two tubes were heated at 60° C. for 19 hours. The polymer from the mixture of 2 parts carbonate ester and 1 part dicarbonate ester was a very hard, clear, glass-like substance having a hardness reading of 77 to 84 on the Barcol Impressor ("D" scale) and less brittle than a polymer of the dicarbonate alone. The polymer obtained from the mixture of 2 parts dicarbonate ester and 1 part of the carbonate ester was a tough, non-thermoplastic material at room temperature having a hardness of 20–50 on the Barcol Impressor ("D" scale).

In utilizing the esters and polymers of this invention in synthetic resin formulation, they may be admixed with any of the compounding ingredients which are usually admixed with plastic materials. For example, it may be desirable in some instance to incorporate suitable plasticizing materials in the monomeric ester before polymerization in order to render the hard glass-like polymers less brittle and more elastic. The polymers of this invention may also be blended one with the other or with other synthetic resinous materials to produce resin compositions to enhanced utility.

Although specific examples of the invention have been herein described, it is not intended that the invention be limited solely thereto, but only as required by the spirit and scope of the appended claims.

I claim:

1. A hard, rigid, glass-like, solid thermoplastic polymer of ortho-monochlorophenyl allyl carbonate.

2. A hard, rigid, glass-like, solid polymer of 2,6-dichlorophenyl allyl carbonate.

3. A hard, rigid, glass-like, solid non-thermoplastic copolymer of about 40 parts by weight of ortho-monochlorophenyl allyl carbonate and about 60 parts by weight of diallyl hydroquinone dicarbonate.

4. A hard, rigid, glass-like, solid polymer of a chlorophenyl allyl carbonate containing from 1 to 2 chlorine atoms in the ortho position in the chlorophenyl radical.

5. A hard, rigid, glass-like, solid, non-thermoplastic copolymer of about 1 to 2 parts by weight of ortho-chloro-para-phenylisopropylphenyl allyl carbonate and about 1 to 2 parts by weight of diallyl-2,2-bis-(3-chloro-4-hydroxyphenyl) propane dicarbonate, said copolymer being characterized by being tougher and less brittle than a homopolymer of the diallyl dicarbonate ester alone.

JAMES A. BRALLEY.

REFERENCES CITED

The following references are of record in the file of this patent:

UNITED STATES PATENTS

| Number | Name | Date |
|---|---|---|
| 2,374,081 | Dean | Apr. 17, 1945 |
| 2,402,481 | Adelson et al. | June 18, 1946 |
| 2,455,653 | Bralley et al. | Dec. 7, 1948 |

FOREIGN PATENTS

| Number | Country | Date |
|---|---|---|
| 564,829 | Great Britain | Oct. 16, 1944 |

OTHER REFERENCES

Bull. Soc. Chim. (3), 23, 814–822 (1900).
Comptes Rendus (131), 679–681 (1900).
Bull. Soc. Chim. (3), 21, 815–823 (1899).